United States Patent [19]
Johnson et al.

[11] Patent Number: 5,178,707
[45] Date of Patent: Jan. 12, 1993

[54] METHOD FOR FORMING SEMICONDUCTING POLY(ARYLENE SULFIDE) SURFACES

[75] Inventors: Timothy W. Johnson; Mark J. Dreiling, both of Bartlesville, Okla.

[73] Assignee: Phillips Petroleum Company, Bartlesville, Okla.

[21] Appl. No.: 753,146

[22] Filed: Aug. 30, 1991

[51] Int. Cl.⁵ .................... B29K 81/00; B29K 103/04
[52] U.S. Cl. ...................................... 156/230; 156/344
[58] Field of Search ............... 156/230, 306.3, 344; 428/420

[56] References Cited

U.S. PATENT DOCUMENTS

| | | | |
|---|---|---|---|
| 3,932,250 | 1/1976 | Sato et al. | 156/344 |
| 4,113,696 | 9/1978 | Williams et al. | 260/448.20 |
| 4,151,157 | 4/1979 | Williams et al. | 260/42.15 |
| 4,210,459 | 7/1980 | Williams et al. | 106/308 |
| 4,292,106 | 9/1981 | Herschdorfer et al. | 156/334 |
| 4,554,210 | 11/1985 | Long et al. | 428/349 |
| 4,863,635 | 9/1989 | Lear | 252/518 |
| 4,957,816 | 9/1990 | Adkins | 428/411.1 |
| 5,091,251 | 2/1992 | Sakumoto et al. | 428/344 |

*Primary Examiner*—Jill L. Heitbrink
*Attorney, Agent, or Firm*—George E. Bogatie

[57] ABSTRACT

A method for coating a poly(arylene sulfide) polymer surface with a semiconductive layer for static charge dissipation and/or induction shielding comprises laminating a poly(arylene sulfide) substrate against a copper foil sheet at a temperature above the melting point of the PAS substrate, wherein the copper foil sheet has been treated with a silane selected from a specific group. When the laminate is cooled and the copper foil peeled away, a poly(arylene sulfide) substrate having a semiconductive surface coating is obtained.

9 Claims, No Drawings

METHOD FOR FORMING SEMICONDUCTING POLY(ARYLENE SULFIDE) SURFACES

This invention relates to conductive polymers. In one aspect, it relates to coated arylene sulfide polymer surfaces exhibiting electrical resistance characteristics of a semiconducting material. In another aspect, it relates to a method for forming a conductive coating on poly(arylene sulfide) polymer material for static charge dissipation, induction shielding etc.

Poly(arylene sulfide), (hereinafter referred to as "PAS" for brevity), resin is an engineering thermoplastic material, which due to its stability at high temperatures, superb mechanical properties and resistance to various chemicals, has found ever widening areas of application. The tendency of polymeric articles, such as films made of PAS, to accumulate detrimental static electrical charges on surfaces thereof, is well known. When two surfaces are brought into contact with each other, a transfer of electrons may occur, resulting in a residual static electrical charge when the surfaces are separated. This phenomena is known as triboelectricity. If the surface is composed of a material that is an electrical conductor, the electrons will dissipate quickly, thereby eliminating the excess charge. On the other hand, if the surface is composed of a material that is an electrical insulator, the surface charge takes much longer to dissipate with the retention of the static charge resulting in numerous problems, such as promoting an attraction for dust, creating a potential explosion hazard in the presence of combustible fluids, difficulties in handling films, damaging sensitive electronic components packaged in sheet or film, material etc. Another more specific instance where lack of a charge dissipative surface results in serious problems occurs in the manufacture of electronic components such as certain types of field effect transistors where containers having charge dissipative characteristics must be provided for handling the sensitive components during manufacturing assembly operation.

While PAS processing techniques known in the art provide a material which is highly suited for many other applications, it has been found that lack of satisfactory static charge dissipation has limited the use of this thermoplastic material in some applications, such as packaging components sensitive to electrical discharge, which could otherwise benefit from the PAS materials' many outstanding characteristics.

Many methods are known for imparting conductivity, semiconductive or static charge dissipative characteristics to polymeric substrate material, such as filling the polymeric material with semiconductive fillers or coating with a metallic or semiconductive coating. Metallic coatings, however, frequently do not adhere well to plastics, and thus a metallic coating may not retain its effectiveness over a long period of time. Furthermore, metallic coatings are frequently unstable under certain use conditions, and may oxidize or corrode under these conditions, which also leads to loss of effectiveness.

For determining resistance properties of material in sheet form, such as a conductive coating applied to a substrate, a value for sheet resistivity or conductivity is measured in accordance with ASTM method D257. The resistance between opposite edges of a thin rectangular sheet is equal to the sheet conductivity times the distance between the electrical contacts of a two terminal measurement used to measure resistance in the ASTM method, divided by the width of the sheet. Sheet resisitivity of less than $10^5$ ohms/square is generally considered as "conductive material" and sheet resistivity greater than $10^5$ but less than $10^{12}$ is considered as "static dispative". As used herein, a semiconductor is a material which conducts an electric current somewhat poorly, but which cannot be classified as an insulator. While sheet resisitivities on the order of $10^{10}$–$10^{12}$ ohm/sq. may be adequate for static dissipation in non-critical applications, much lower resistivities on the order of $10^6$ ohm/sq. are preferred for critical applications such as containers used in manufacturing operations for sensitive electronic components.

The known processes for thermoplastic polymer to semiconductor transition, however, generally incorporate many process steps and materials, and further, they often impose constraints on processing and/or application of the PAS material. These constraints are especially noticeable in thin plastic material, such as PAS film or sheet-like material.

Accordingly, an alternate method for imparting semiconductivity to PAS substrates, and which could be used on a thin sheet of arylene sulfide polymer, would be highly desirable for static charge dissipative characteristics.

It is a primary object of this invention to provide a semiconductive coating on a PAS substrate for static charge dissipation.

It is a further object of this invention to provide a method of coating a PAS substrate which is effective, efficient, safe and economical.

It is a still further object of this invention to provide a semiconductive coating which features hardness and is well bonded to a PAS substrate.

SUMMARY OF THE INVENTION

In accordance with this invention, we have discovered that a semiconductive coating can be formed on the surface of a PAS polymer substrate by forming a laminate of the PAS polymer substrate and a copper foil sheet which has been pretreated with a silane selected from a specific group. The laminate is formed at a temperature above the melting point of the PAS substrate, and when the copper foil is peeled away from the laminate, a PAS substrate having a semiconductive coating is obtained.

In a preferred embodiment of this invention, a poly(phenylene sulfide) material in a sheet-like form, optionally including glass reinforcement, is sandwiched between two sheets of commercially available copper foil, which have been pretreated with a silane available under the product name Organofunctional Polysulfide Silane Y-9194 from Union Carbide Corporation. The thus superimposed layers are kept in contacted condition and held under temperature and pressure conditions sufficient to form a laminate. After cooling the laminate, the copper layers are easily peeled away revealing a gold colored surface exhibiting semiconductor characteristics. The thus obtained surface is effective for static charge dissipation in critical applications which require low surface resistivity.

DETAIL DESCRIPTION OF THE INVENTION

It is general practice, for example, in producing a printed circuit board for mounting electronic components, to apply a metallic foil, such as a copper foil onto a substrate, which can be a sheet-like material either flexible or rigid. Through employment of a suitable adhesive or coupling agent, the metallic foil can be securely bonded to the substrate. Alternately, a metallic layer on the substrate can be formed by laminating, etc.

In the present invention, however, it has been discovered that applying a plain copper foil to a PAS polymer substrate by the generally known methods fails to achieve strong bonding of the metallic foil to the PAS substrate. Further, in accordance with this invention, the surface of a PAS substrate which is processed by compression molding against a copper foil pretreated with Y9194 coupling agent in a mold heated to a temperature higher than the melting point of the PAS material, ordinarily 290° to 330° C., can react to form a hard, scratch resistant as well bonded coating on the PAS surface. Surprisingly, the coated surface exhibits electric current conduction characteristics of a conductive or semiconductor material. The coating formed on the PAS surface is though to be a sulfide of copper, which will advantageously remain stable under a wide variety of otherwise destructive conditions.

For the purposes of this disclosure and the appended claims, the term PAS is intended to designate arylene sulfide polymers. Uncured or partially cured poly(arylene sulfide) PAS polymers, whether homopolymer, copolymer, terpolymer, and the like, or a blend of such polymers, can be used in the practice of the present invention. The uncured or partially cured polymer is a polymer the molecular weight of which can be increased by either lengthening of a molecular chain or by cross-sinding or by combination of both by supplying thereto sufficient energy, such as heat (optionally in the presence of oxygen).

Preferred PSA of the present invention can be represented by repeating units of the structural formula:

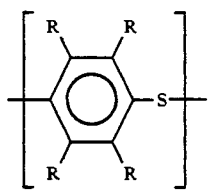

wherein R is selected from the group consisting of hydrogen and alkyl radicals having 1 to 4 carbon atoms.

PAS of the present invention can be branched by the addition of a branching agent, such as a trihalobenzene. Branching agents can be represented by the formula:

$ArX_n$ wherein X is halogen, $n \geq 3$ and Ar is an aromatic nucleus.

Some examples of poly(arylene sulfide) suitable for the purposes of the present invention include poly(2,4-tolylene sulfide), poly(4,4'-biphenylene sulfide), and poly(phenylene sulfide). Because of its availability and desirable properties (such as high chemical resistance, nonflammability, and high strength and hardness) poly(phenylene sulfide) (PPS) is the presently preferred poly(arylene sulfide).

In a preferred embodiment of the present invention, a high molecular weight, linear PAS is produced in a reaction mixture from polymerization which includes linear PAS, sodium chloride, water and N-methyl-2-pyrrolidone (NMP). The reaction mixture can be made in accordance with the teachings of U.S. Pat. No. 3,919,177 to Campbell which is incorporated herein by reference.

According to the process described therein, p-dichlorobenzene is reacted with sodium sulfide in N-methylpyrrolidone solvent in the presence of an alkali metal carboxylate. Various poly(arylene sulfides) are commercially available under the trademark Ryton ® from Phillips Petroleum Company, Bartlesville, Okla.

Although this invention is not limited thereto, the resin compositions can also contain other ingredients, such as reinforcing agents and fillers.

The reinforcing agent can be, for example, glass. Fiber glass is preferred because in this form (i.e. high ratio of length to diameter) the reinforcement utility of the glass is optimized. Other forms of glass, such as, for example, power, grain and beads are, nonetheless, within the scope of our invention. Examples of other suitable reinforcing agents include, by way of nonlimiting example, ceramic fibers, carbon fibers and aramid fibers.

Fillers can be used to improve the dimensional stability, thermal conductivity and mechanical strength of the composition. Suitable fillers include, for example, talc, silica, clay, alumina, calcium sulfate, calcium carbonate, mica and so on. The fillers can be in the form of, for example, powder, grain or fiber.

Besides reinforcing agents and fillers, the compositions of this invention can optionally contain relatively small amounts of other ingredients such as, for example, pigments and processing aids.

The presently preferred PAS is poly(phenylene sulfide) (PPS). This resin is commercially available under the trademark Ryton ® from Phillips Petroleum Company, Bartlesville, Okla.

The preferred PAS surface shapes contemplated in this invention include films and other flexible sheet-like surfaces, generally planar surfaces which can be on solid objects molded from PAS, objects coated with PAS, or laminates of PAS with solid materials, such as fiberglass, fabric, cloth, etc., or articles made from PAS which is either unfilled or filled with fiberglass, as well as on any other suitable type of material possessing a cured or uncured PAS surface. The presently preferred polymer is the poly(phenylene sulfide) resin either unfilled or filled with about 5 to about 60 weight percent of chopped glass fibers.

In the present context, cured PAS resin, or a coating made from this resin, is one which has been heat-treated for a time and at a temperature which are sufficient to increase the melt viscosity of the resin or the toughness of the coating. The typical cure procedure is heat-treating the resin for 1 hour at 260° C. (500° F.).

In this invention, the preferred silane can be obtained from Union Carbide Corporation under the product name Organofunctional Polysulfide Silane Y-9194. Silane Y-9194 is a mixture of compounds with formula I given below:

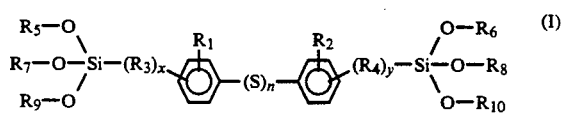

wherein $R_1$ and $R_2$ are $-CH_3$; wherein $R_3$ and $R_4$ are $-CH_2CH_2-$; wherein $R_5$, $R_6$, $R_7$, $R_8$, $R_9$ and $R_{10}$ are $-CH_2CH_3$; wherein $x=1$ and $y=1$; and wherein the average value of n is about 2.8.

The actual number of sulfur atoms (S) linking two aromatic groups is determined by the value of n which represents a positive integer and ranges from 1 to 30. Preferably, within the scope of this invention represented by the formula I, n ranges from 1 to 10. The more preferred value for n is from 1 to 5.

Each of $R_1$ and $R_2$ is H or an alkyl group having from 1 to 30 carbon atoms. Each of $R_5$, $R_6$, $R_7$, $R_8$, $R_9$ and $R_{10}$ is an alkyl group having from 1 to 30 carbon atoms. The alkyl groups associated with $R_1$, $R_2$, $R_5$, $R_6$, $R_7$, $R_8$, $R_9$ and $R_{10}$ can be linear (e.g. n-propyl) or branched (e.g. tert-butyl). Examples of alkyl groups within the scope of formula 1 include, but are not limited to, those listed in U.S. Pat. No. 4,504,551 to Leland, which is incorporated herein by reference.

Use of Silane Y9194 represents the best mode of this invention as presently contemplated by the inventors. Other compounds within the scope of formula I can be made by modification of Silane Y-9194 or through separate synthesis routes. Persons skilled in the art can employ known techniques of silicon esterification, aromatic substitution, etc. to produce the compounds of formula I in a variety of ways. The method employed in making the silanes of formula I is immaterial to the practice of this invention.

For the purposes of this invention, any copper foil which provides the desired coating on the PAS substrate can be employed for laminating against the PAS substrate. Examples of useful copper foils include rolled or rolled and annealed foils 0.0005" to 0.005 thick commonly called 110 copper, available e.g. from Olin Corporation or Metallverken. The foil in the following example was rolled, annealed 0.002" thick from Metallverken, which was obtained through Metal Foils, Inc. of Willoughby, Ohio.

In a preferred embodiment, the silane treated copper foil and the PAS substrate are sandwiched together with the silane coated copper surface contacting the PAS substrate. The layers are kept in contact for a sufficient time and under temperature and pressure conditions to form the semiconductive coating. The temperature employed, as previously stated, is about 320° C. This temperature along with a pressure of about 200 psi is held for about 3 minutes.

EXAMPLE

Approximately 10 ml of silane Y-9194 was diluted with 100 ml of isopropyl alcohol. The resulting solution was then diluted with 100 ml of water with stirring to form a milky suspension. The resulting suspension was further diluted with alternate portions of isopropyl alcohol and water to achieve the desired concentration. Thereupon 8" squares of cleaned and bright dipped 0.002" thick alloy 110 copper (99.9% pure) from Metallverken was immersed in the milky suspension. The suspension was stirred and the foils turned occasionally to assure relatively uniform coverage. After 30 minutes, the foils were removed, rinsed with deionized water, drip dried, lightly blotted and finally air dried. The resulting foils were laminated with PPS resin of high molecular weight, acid washed linear PPS resin having a flow rate of 100 g/10 min., and having two layers of glass fabric reinforcement. The molding conditions were 4 minutes in a 320° C. press at contact pressure, 3 minutes in the 320° C. press at 15,000 lb. force, then rapidly transferring to a water cooled press and pressured up for 3 minutes at 20,000 lb. force. The resulting laminate was then removed from the press, trimmed and annealed 1 hr. at 150° C. It was observed that the copper foil peeled readily from the polymer portion, leaving a semi metallic sheen on the surface of the polymer portion. The surface was also found to be appreciably conductive, having a surface resistivity of 2450 ohms/-square.

It is expected that other methods for applying the Y-9194 organofunctional silane solution can be effective, for example, spraying, brushing, rolling or other known methods.

It should be noted that the copper foil, after peeling from the PPS article, appears clean, suggesting that the foil can be reused several times. Furthermore, use of a copper plate optionally with curved or indented surfaces may be useful for molding non-flat static dissipative surfaces.

Reasonable variations and modifications of this invention are possible by those skilled in the art, and such variations and modifications are within the scope of this disclosure and the appended claims.

That which is claimed is:

1. A method of coating a poly(arylene sulfide) substrate with a semiconductive layer, said method comprising:

(a) applying onto at least one side of a copper foil an effective amount of a silane within the formula:

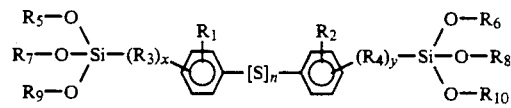

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 or 1; and wherein each of $R_3$ and $R_4$ is an alkylene group having from 1 to 30 carbon atoms;

(b) contacting the silane treated copper foil and said poly(arylene sulfide) substrate, and laminating superimposed layers of said treated copper foil and said poly(arylene sulfide) substrate at a temperature above the melting point of said poly(arylene sulfide) substrate; and (c) peeling said copper foil away from said poly(arylene sulfide) substrate.

2. A method in accordance with claim 1 wherein said poly(arylene sulfide) is poly(phenylene sulfide).

3. A method in accordance with claim 1 wherein said superimposed layers of copper foil and poly(arylene sulfide) substrate are laminated at a temperature in a range of about 290° C. to about 330° C. at a pressure of about 200 psi.

4. A method in accordance with claim 1 wherein n is an integer from 1 to 10; wherein each of $R_1$ and $R_2$ is H or an alkyl group having 1 to 10 carbon atoms; wherein each of $R_5$, $R_6$, $R_7$, $R_8$, $R_9$ and $R_{10}$ is an alkyl group having from 1 to 10 carbon atoms; wherein x=1; wherein y=1; and wherein each of $R_3$ and $R_4$ is an alkylene group having from 1 to 10 carbon atoms.

5. A method in accordance with claim 1 wherein n is an integer from 1 to 5; wherein each of $R_1$ and $R_2$ is H or an alkyl group having 1 to 5 carbon atoms; wherein each of $R_5$, $R_6$, $R_7$, $R_8$, $R_9$ and $R_{10}$ is an alkyl group having from 1 to 5 carbon atoms; and wherein each of $R_3$ and $R_4$ is an alkylene group having from 1 to 5 carbon atoms.

6. A method in accordance with claim 1 wherein said poly(arylene sulfide) is poly(phenylene sulfide); wherein each of $R_1$ and $R_2$ is —$CH_3$; wherein each of $R_5$, $R_6$, $R_7$, $R_8$, $R_9$ and $R_{10}$ is —$CH_2CH_3$; wherein $x=1$; wherein $y=1$; and wherein each of $R_3$ is —$CH_2CH_2$—.

7. A method in accordance with claim 2 wherein said poly(phenylene sulfide) contains reinforcement comprising glass fibers.

8. A method in accordance with claim 2 wherein said poly(phenylene sulfide) substrate comprises a sheet-like structure.

9. A method in accordance with claim 2, wherein the surface resistivity of said semiconductive layer exhibits a resistivity of about 2,450 ohms/square.

* * * * *